United States Patent

[11] 3,604,999

| [72] | Inventor | Frank David Pugh<br>Pompano Beach, Fla. |
|---|---|---|
| [21] | Appl. No. | 867,475 |
| [22] | Filed | Oct. 20, 1969 |
| [45] | Patented | Sept. 14, 1971 |
| [73] | Assignee | The Bendix Corporation |

[54] POSITION SERVOMECHANISM INCLUDING A SYNCHRONIZING CIRCUIT FOR BUMPLESS ENGAGEMENT OF A CLUTCHED LOAD
7 Claims, 6 Drawing Figs.

[52] U.S. Cl............................................ 318/591, 318/616
[51] Int. Cl............................................ G05b 7/00
[50] Field of Search................ 318/20.245, 20.425

[56] References Cited
UNITED STATES PATENTS

| 2,429,257 | 10/1947 | Bond | 318/20.425 UX |
| 2,442,329 | 5/1948 | Harrison et al. | 318/20.425 UX |
| 2,493,593 | 1/1950 | Peterson | 318/20.425 |
| 2,589,834 | 3/1952 | MacCullum | 318/20.245 |
| 2,732,520 | 1/1956 | Couanault | 318/20.425 |
| 2,945,170 | 7/1960 | Jones et al. | 318/20.245 |
| 3,150,304 | 9/1964 | Armstrong et al. | 318/20.425 |
| 3,156,438 | 11/1964 | Diller et al. | 318/20.245 X |
| 3,373,675 | 3/1968 | Best | 318/20.425 X |

*Primary Examiner*—T. E. Lynch
*Attorneys*—Plante, Arens, Hartz, Smith & Thompson, Bruce L. Lamb and William G. Christoforo ABSTRACT: A servosystem motor driven by an error signal is connected to a controlled element through a clutch which is disengaged when the servosystem is initially energized. Resulting rapid movement of the now unloaded motor generates a large feedback voltage which is derived from motor back e.m.f. Feedback voltage is applied to an integrating feedback circuit to generate a degenerative feedback signal having servomotor velocity and displacement components. A servosystem modulator combines a command signal with the feedback signal to generate the error signal which is thus minimized before the clutch is engaged to provide automatic synchronization of the servosystem with the element. The clutch may now be engaged without abrupt, dangerous movement of the element.

PATENTED SEP 14 1971 3,604,999
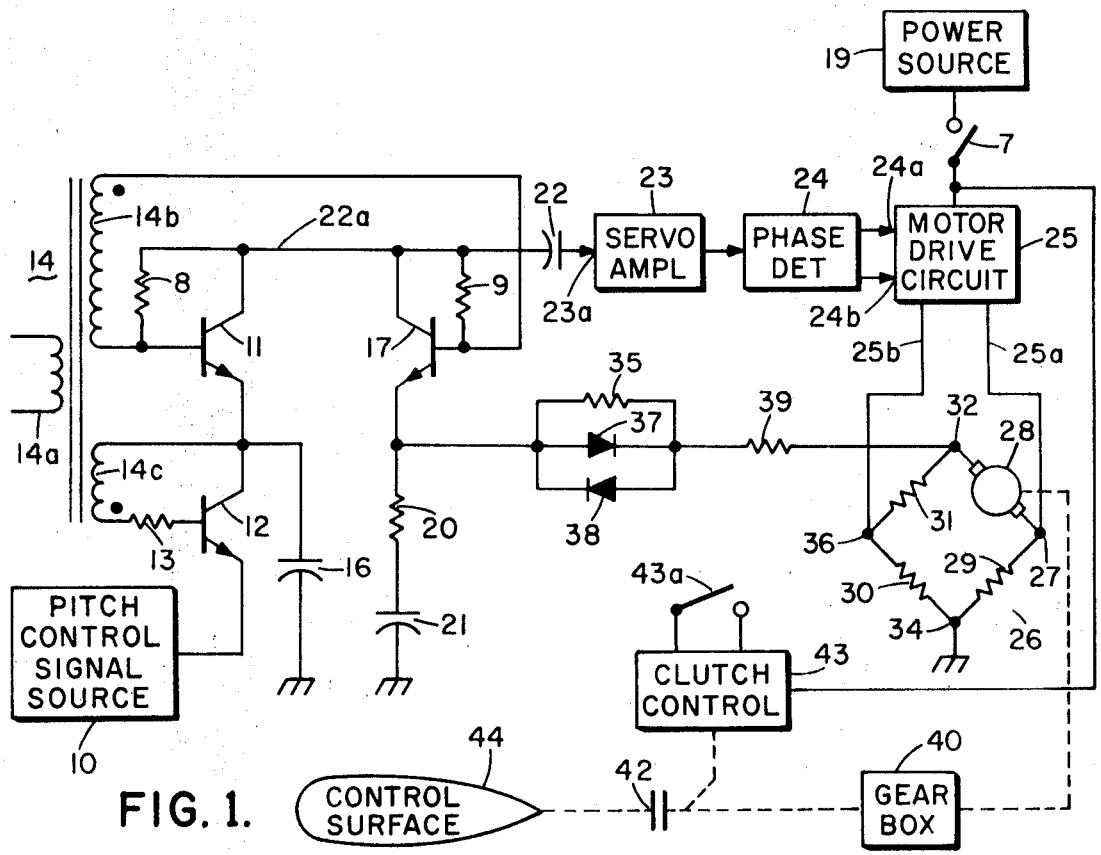
FIG. 1.
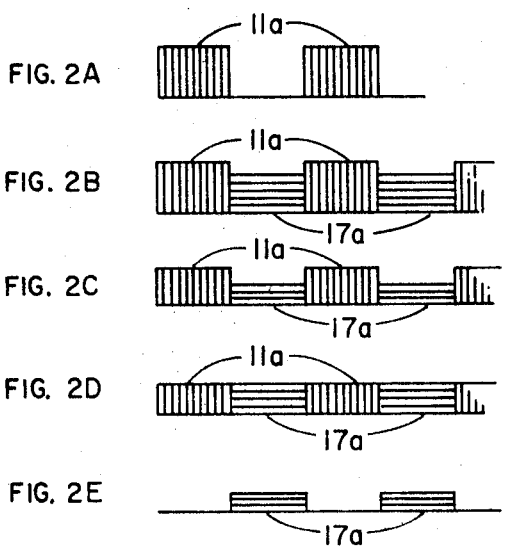
| | | MOTOR ACTION |
|---|---|---|
| FIG. 2A | | HIGH SPEED |
| FIG. 2B | | LOW SPEED |
| FIG. 2C | | INTERMEDIATE SPEED |
| FIG. 2D | | STOPPED |
| FIG. 2E | | REVERSE |
INVENTOR
FRANK D. PUGH
BY
*William G. Christoforo*
ATTORNEY

POSITION SERVOMECHANISM INCLUDING A SYNCHRONIZING CIRCUIT FOR BUMPLESS ENGAGEMENT OF A CLUTCHED LOAD

BACKGROUND OF THE INVENTION

This invention relates generally to servocontrol systems and more particularly to a feedback arrangement for a control system having a servomotor mechanically positioning a movable element in response to a control signal wherein a servomotor speed signal is derived from the servomotor back e.m.f. and additionally includes means for automatically synchronizing the servo system with the element.

Control systems are used in many applications for mechanically positioning a member by action of a servomotor which operates in accordance with an error signal. One such application is an automatic pilot for aircraft, wherein various elements such as a rudder, elevators and ailerons are moved to control the movement of the craft. In such systems an aircraft maneuver command which, operating through the automatic pilot, instructs the aircraft to perform a certain maneuver, is entered by the aircraft operator into the automatic pilot. If a maneuver command exists at the input of the pitch, yaw or roll amplifiers which comprise the automatic pilot at the moment of automatic pilot engagement, the servosystem error signal will be a maximum and the aircraft will change attitude abruptly resulting in discomfort and possibly danger to the passengers. In the past this problem has been solved by some form of automatic synchronization or by the use of meters that enable the operator to manually synchronize the system before engagement. Manual synchronization is difficult in turbulent air and usually requires engagement of one axis at a time if the autopilot has a high degree of authority. Another means used in the roll channel to solve this problem is a detent interlock which assures a wings level command signal and which requires that the aircraft be in a wings level attitude at the moment of autopilot engagement. Another prior art means of synchronizing the pitch axis consisted of an amplifier which sensed the presence of a pitch signal and a motor which was driven by the amplifier so as to rotate a potentiometer which developed a canceling signal. The motor turned the potentiometer until the input signal was nulled and thereby assured that no engaged transient occurred.

Automatic pilots also generally require the use of means to sense the position of the surface being controlled so as to provide a surface position feedback signal in the automatic pilot servosystem. Also, if tight control is desired, a surface rate signal proportional to the rate at which the control surface is moving is also required to stabilize and smooth the action of the control surface to provide accurate but smooth control of the aircraft. Both position and rate feedback have been provided most conveniently by a velocity generator which is directly connected to the system servomotor so as to generate a velocity signal proportional to motor velocity. The velocity signal is applied through a dropping resistor to an integrating circuit with the voltage across the dropping resistor being proportional to motor velocity and with the voltage developed across the integrating circuit being proportional to the time integral of the motor velocity, that is, to motor displacement, and hence, controlled element displacement.

SUMMARY OF THE INVENTION

It has been recognized that if the back e.m.f. of the servomotor can be sensed this signal will be proportional to motor speed and therefore the back e.m.f. signal would be the equivalent to the signal generated by the velocity generator previously used and which was drivenly attached to the servomotor. Thus, the advantages of having a servo feedback signal having both velocity and position components would be preserved without the expense of providing a velocity generator.

It is thus an object of the present invention to provide an improved feedback system for use in servomotor control systems.

Another object of the invention is to provide a simple feedback system which operates directly from the servomotor and which has both a direct effect dependent upon motor speed and an integrated effect dependent upon motor displacement.

Another object of this invention is to provide a control system including a servomotor for positioning a movable element in response to a control signal, wherein controlled signal degenerative feedback is derived from the servomotor e.m.f.

The above objects of the invention are accomplished by connecting as one arm of a resistance bridge a servomotor having a stalled motor impedance which will cause the resistance bridge to be essentially balanced and having a running no-load impedance which will cause the resistance bridge to be highly unbalanced. The servosystem error signal is impressed across two opposite bridge junction points and the servosystem feedback is taken from the other two bridge junction points. The feedback thus obtained will be proportional to motor back e.m.f. which, of course, is proportional to motor speed. This feedback is equivalent to the output of a velocity generator connected to the motor and can thus be used to stabilize an associated servoamplifier using the same techniques that would be used if the velocity feedback from a velocity generator were available. Additionally, a clutch connecting the servomotor to the control surface to be moved is provided and will remain unengaged for a least some extremely short but finite time period after the automatic pilot is energized. Since, at the instant the automatic pilot is energized, the servosystem error signal is at a maximum, as previously explained, and the servomotor is disconnected from the control surface, the motor will rotate at a maximum speed thus generating maximum rate feedback which additionally tends to increase position feedback at a maximum rate. Since this feedback is degenerative the servosystem error signal will be decreased to a minimum value even though the control surface is not moved. Thus, when the clutch is engaged the servosystem error signal will be a minimum and the desired aircraft maneuver will be performed smoothly without abrupt movement. It can thus be seen that the automatic pilot will be automatically synchronized at the time the command maneuver commences.

It is thus one more object of this invention to provide an automatic pilot automatic synchronization means.

It is one more object of this invention to provide an automatic pilot feedback means for eliminating abrupt aircraft attitude changes upon engagement of the automatic pilot.

BRIEF DESCRIPTION OF THE DRAWINGS

FIG. 1 is a schematic of an aircraft automatic pitch control channel employing the invention.

FIGS. 2A through 2E are line graphs of the error signal in the circuit of FIG. 1 taken at various times during the operation of the control channel.

DESCRIPTION OF THE PREFERRED EMBODIMENT

Although the following describes a servosystem in an aircraft automatic pilot for controlling an aircraft control surface it should be obvious that the invention can be used in other like servosystems requiring synchronization of the error signal and controlled element. Refer first to FIG. 1 wherein there is illustrated a system for controlling the elevators of an aircraft to thereby control the pitch of the aircraft. Maneuver command signals are obtained from a pitch control signal source 10, which signals may include a plurality of components including one component derived from a gyro in the aircraft and which varies with the position of the aircraft. A modulator is comprised of transistors 11 and 17. Transistor 11 is provided with biasing and current limiting resistor 8 connected between its base and collector electrodes. The pitch control signal is applied to the emitter of transistor 12. Transistors 11 and 12 are alternately rendered conductive by the alternate half-cycles of an alternating current chopper signal (from a source not shown) applied to primary winding 14a of transformer 14 and induced in the oppositely poled, with respect to one another, secondary transformer windings 14b and 14 c. This signal is essentially a square wave which is developed by clipping a high level sine wave. Transistor 12 is provided with a current limiting resistor 13 in its base circuit. With transistor 11 nonconductive and transistor 12 conductive capacitor 16 will charge to the maximum value of the pitch control signal during that particular half-cycle of the chopper signal. During the half-cycle of the chopped signal that transistor 11 is conductive and transistor 12 is nonconductive the voltage across capacitor 16 is sampled so that a square wave output voltage is formed at the collector of transistor 11 and applied to capacitor 22. The voltage applied to capacitor 22, being of high frequency, passes therethrough and is amplified in servoamplifier 23. The servoamplifier input port 23a is characterized by a high impedance so that the signal on capacitor 16 and hence at the collector electrode of transistor 11 does not decay during the time transistor 11 has been rendered conductive. The output from servoamplifier 23 is applied to phase detector 24. Phase detector 24 generates an output either on line 24a or 24b, depending upon the phase of the signal applied thereto. How this signal varies in phase will be explained below.

A servomotor 28 is arranged as one arm of resistance bridge 26 which additionally includes resistors 29, 30 and 31. The bridge is powered by the motor drive circuit 25 via lines 25a and 25b, the power being supplied by power source 19 through switch contact 7 when closed. The phase and the magnitude of the signal appearing on lines 25a and 25b depends upon the difference in magnitudes between the signal generated by pitch control signal source 10 and a feedback signal which appears on the emitter of transistor 17 as will be fully explained below and which determines which of the motor drive circuit input lines 24a or 24b is energized. This difference, that is, the difference between the magnitude of the pitch control signal and the magnitude of the feedback signal, comprises the servosystem error signal.

The feedback voltage across the bridge junction points 32 and 34 is applied across the integrating circuit comprised of capacitor 21 and resistor 20 which is serially connected with the nonlinear current controlling circuit comprised of resistors 35 and 39 and diodes 37 and 38. The voltage across resistor 20 and capacitor 21 is applied to the emitter electrode of transistor 17. Transistor 17 is also provided with biasing and current limiting resistor 9 connected across its base and collector electrodes. Secondary transformer winding 14b is connected to the base electrode of transistor 17 in phase opposition as its connection to the base electrode of transistor 11. Thus transistor 17 will be conductive at the same time transistor 12 is conductive.

The square wave nature of the switching voltage assures that the transition from ON to OFF occurs quickly so that there will be no "holes" in the output causing a noise component to be developed which would saturate the amplifier. When transistor 17 is conductive the voltage across resistor 20 and capacitor 21 is applied to its collector terminal and hence to capacitor 22. Because transistor 17 conducts on alternate half-cycles with respect to transistor 11, the square wave outputs thereof are 180° out of phase with the square wave output of transistor 11 and the portions of the square waves of each polarity are in effect interspersed with each other. In short, the collector voltage from transistor 17 cooperates with the collector voltage from transistor 11 to provide an error signal which is applied through capacitor 22 servoamplifier 23, phase detector 24, and motor drove circuit 25 to servomotor 28. The error signal is a square wave having an amplitude which corresponds to the difference between the amplitudes of the square waves of the collector electrodes of transistors 11 and 17. Either square wave may have the larger amplitude so that the output may in effect be reversed in polarity, with the resultant phase being determined by phase detector 24 so as to determine the correct direction of rotation of servomotor 28.

The integrator circuit includes a resistor 20 in the shunt branch in addition to capacitor 21. This resistor takes a part of the voltage across points 32 and 34 of bridge circuit 26 and in effect bypasses the integration effect. When servomotor 28 initially begins to rotate, thus generating a back e.m.f. a part of this is developed across resistor 20 and is applied to the emitter of transistor 17. This feedback voltage produced by the servomotor will cause current flow through the circuit including resistors 35, 39 and 20 to charge capacitor 21 so that the voltage thereacross builds up in accordance with the total movement of displacement of the servomotor. Accordingly, the voltage across resistor 20 is first supplied to the modulator comprised of transistor 17, and then the voltage across capacitor 21 will be added to this and will remain when the voltage across resistor 20 has ceased indicating that the servomotor has stopped.

The servomotor is mechanically coupled through gear box 40 and disengageable clutch 42 to drive an aircraft control surface, for example, control surface 44. Clutch 42, in a manner well known to those skilled in the art, is controlled by clutch control 43 which might suitably be either a mechanical control, such as a linkage, or an electrical control, such as a solenoid. It is only necessary for a complete and satisfactory working of the invention that clutch 42 not be engaged until some short but finite time after the servomotor has been energized as will be fully described below. This delay of clutch engagement might be controlled manually by the aircraft operator in a manner which should become obvious as this description proceeds, or more suitably, clutch control 43 can be interlocked with power source 19 and switch contact 7 so as to prevent engagement of clutch 42 until after switch contact 7 is closed to thus energize servomotor 28 should an error signal be present. In the specific embodiment shown clutch control 43 includes a latching circuit which is latched by momentary closure of switch contact 43a only if energized from power source 19 by the previous closure of switch contact 7.

The operation of the invention will now be described with reference to FIG. 1 and the curves of FIG. 2. Assume initially that switch contact 7 is open so that clutch control 43 is unlatched and clutch 42 is disengaged, and that additionally a pitch control signal exists at the emitter electrodes of transistor 12. If the aircraft operator should now depress switch 43a, clutch control 43 will remain unlatched since switch 7 is open, and clutch 42 remains disengaged. To activate the autopilot the aircraft operator closes master switch contact 7. As previously mentioned, the voltages induced in the oppositely poled secondary windings 14b and 14c cause transistor 11 to be conductive on alternate half-cycles of the chopper voltage with respect to the conductive state of the transistors 12 and 17. Capacitor 16 senses and stores the maximum value of the pitch control signal occurring during the conductive period of transistor 12. When transistor 11 becomes conductive this voltage on capacitor 16 is sensed and appears on transistor 11 collector electrode. Before servomotor 28 starts to rotate transistor 17 emitter electrode is at ground potential and the voltage on line b 22a, which is a common line with the collector electrodes of transistors 11 and 17, is as shown in FIG. 2A. For ease in understanding the figures, the legend 11a in FIG. 2 indicates the voltage on line 22a of FIG. 1 which is contributed when transistor 11 is conductive and the legend 17a indicates the voltage on line 22a of FIG. 1 which is contributed when transistor 17 is conductive. At the time the autopilot is activated by the closing of master switch contact 7, assuming a pitch control signal is present, the servosystem error signal is a maximum and servomotor 28 starts to run at high speed. This is especially so since clutch 42 is disengaged thus removing the motor load. With servomotor 28 running at high speed, the voltage across resistor 20 is high and the rate of capacitor 21 voltage buildup is high. Thus the feedback voltage on the emitter of transistor 17 is high and rapidly approaches the magnitude of the pitch control signal voltage. The effect of this on the servosystem error signal is seen in FIG. 2B where the pitch control signal contribution 11a has remained constant since the clutch has remained unengaged and the feedback contribution 17a has increased to almost equal the pitch control signal contribution so that the system is now synchronized. The actual error signal which can pass through capacitor 22 is, of course, as previously explained, the step, that is, the difference in magnitude between the two contributions. So long as the clutch remains unengaged, the error signal will remain quite small and in a properly designed circuit the error voltage will be such as to cause the servomotor to either rotate slowly or to be stopped but having a positive starting bias. This can be accomplished in the conventional manner in the main by proper choice of the individual resistors in resistance bridge 26. In particular, the above can be accomplished by choosing resistor 31 to be slightly greater than the stalled resistance of servomotor 28 and by choosing resistors 29 and 30 to be equal to each other and much larger than resistor 31.

With the system now synchronized the operator may engage the clutch by momentarily depressing switch 43a to energize and latch clutch control 43 which has been qualified by the closing of switch 7. Servomotor 28 is now connected through gear box 40 and clutch 42 to control surface 44. Since the connection occurred while the error signal was quite small, there is no sudden movement of the control surface. The load of the control surface on the servomotor will slow or stop the motor, thus allowing the voltage across capacitor 21 to discharge through the circuit comprised of diodes 37 and 38 and resistor 35, and through 39 and bridge 26. The voltage at the emitter of transistor 17 thus gradually decreases, as seen in FIG. 2C, permitting the motor to slowly increase in speed and move control surface 44. This control surface movement causes the aircraft to move toward the commanded attitude, thus decreasing the pitch control signal contribution as seen at FIG. 2D. When the aircraft has assumed the commanded pitch, the pitch control signal contribution disappears as seen at FIG. 2E, leaving some residual feedback contribution. Since this is reversed in polarity, the servomotor will reverse direction and slowly restore the control surface to a position to maintain commanded pitch.

It is advantageous that the system become synchronized quite rapidly after switch 7 is closed and additionally that the error signal increase rapidly once clutch 42 is engaged. This is accomplished by the use of the circuit comprised of resistor 35 and diodes 37 and 38. It will be noted that the maximum voltage drop across this circuit is the forward drop across either of the diodes and that below this drop both diodes are turned off and the voltage drop is determined solely by resistor 35. When switch 7 is closed, it will be remembered that capacitor 21 is discharged and the servomotor initially rotates at high speed. Thus the voltage at point 32 will be much higher than the voltage at the emitter of transistor 17 and diode 38 will be forward biased allowing current to flow therethrough and through resistor 20 and into capacitor 21. This permits synchronization to occur rapidly and diode 38 to become back biased. The reaction of the voltage at the emitter of transistor 17 to changes in voltage at point 32 will now become rather more sluggish until clutch 42 is engaged. The motor is now either stopped or slowed thus dropping the voltage at point 32. Diode 37 now becomes forward biased and capacitor 21 can discharge smoothly, albeit rapidly, so that the control surface will respond smoothly and rapidly to the maneuver command.

In a properly designed system synchronization will occur in less than a second which is normally a much shorter time period than is required for an operator to sequentially actuate switches 7 and 43a.

The invention claimed is:

1. In a servosystem including means for providing a control signal representing desired movement of an element, a servomotor for moving said element, modulator means including first and second portions for producing square waves which are out of phase with each other, means for applying said control signal to said first portion of said modulator means to control the amplitude of said square wave produced thereby, means for applying a feedback signal to said second portion of said modulator means to control the amplitude of said square waves for generating an error signal to control said servomotor, an improvement comprising:

feedback circuit means responsive to movement of said servomotor for generating said feedback signal;

means for engaging and disengaging said servomotor from said element;

means for activating said servosystem;

means for combining said square waves to produce an error signal when said square waves are of different amplitudes; and means for interlocking said engaging and disengaging means with said activating means whereby said engaging means disabled until said error signal is minimized.

2. A servosystem as recited in claim 1 wherein said feedback circuit means includes means for generating a feedback voltage correlated to the back e.m.f. of said servomotor and means responsive to said feedback voltage for generating said feedback signal.

3. A servosystem as recited in claim 1 wherein said feedback circuit includes a resistor bridge, said servomotor being disposed as one arm of said bridge, a feedback voltage being taken from predetermined points in said bridge, and an integrating circuit responsive to said feedback voltage for generating said feedback signal.

4. A servosystem as recited in claim 3 with additionally nonlinear bilateral current means responsive to said feedback voltage and said feedback signal for connecting said predetermined points to said integrating circuit.

5. A servosystem as recited in claim 3 with additionally bilateral diode current means responsive to the relationship of said feedback voltage with said feedback signal for connecting said predetermined points with said integrating circuit.

6, A servosystem as recited in claim 1 including means for activating said servosystem and with additionally means interrelating said engaging and disengaging means with said activating means.

.7. A servosystem as recited in claim 1 with additionally means for enhancing said feedback signal when said servosystem is initially activated by said activating means.